United States Patent Office

3,578,622
Patented May 11, 1971

---

3,578,622
SPRAYABLE ADHESIVE
Francis W. Brown, West St. Paul, and Leon V. Kremer, Cottage Grove, Minn., assignors to Minnesota Mining and Manufacturing Company, St. Paul, Minn.
No Drawing. Continuation-in-part of application Ser. No. 702,807, Feb. 5, 1968. This application Sept. 12, 1969, Ser. No. 857,536
Int. Cl. C08f 45/30
U.S. Cl. 260—33.8
20 Claims

ABSTRACT OF THE DISCLOSURE

A sprayable adhesive composition is provided which contains a higher concentration of acrylate polymer than was previously possible in sprayable formulations, the acrylate being an elastomeric, crosslinked polymer further characterized as having an organic solvent soluble portion and a predominating organic solvent insoluble portion.

---

This is a continuation of United States application Ser. No. 702,807, filed Feb. 5, 1968.

This invention relates generally to sprayable adhesive compositions and particularly to sprayable adhesive compositions containing a relatively high concentration of an acrylate polymer.

Certain acrylate polymers exhibit highly desirable adhesive properties such as pressure-sensitivity, inherent stability, and tackiness at room temperature. In addition, such acrylates are clear, non-bleeding, nonoxidizing, and non-yellowing. Pressure-sensitive tapes backed on one or both sides with acrylate adhesives are available but in such form are unsuited to many adhesive applications especially where relatively large, irregular, or non-rigid surface areas are involved. These latter applications are considerably more amenable to the use of sprayable adhesives. However, prior to the present invention, even relatively low polymer content acrylate based adhesives were incapable of being successfully sprayed due primarily to the tendency of previously known acrylate compositions to form strings or cobwebs on emergence into the atmosphere. This tendency to cobwebbing increases appreciably with an increase in acrylate content. At extremely low acrylate concentrations, while the cobwebbing tendencies are minimized, the excessive amount of carried liquid required makes the adhesives highly uneconomical and injurious to the porous surfaces to which the adhesive is applied. Cobwebbing can also be minimized somewhat by spraying at high atomization pressures but this expedient is also uneconomical and impractical.

In the case of aerosol sprays, it was also a tendency of previously employed acrylate polymers to agglomerate within the spray apparatus into a semi-solid mass or irreversibly separate into two or more phases, thus rendering the material unsprayable.

It is therefore the primary object of this invention to provide a non-cobwebbing, relatively high acrylate content (at least 2% by volume) sprayable adhesive.

Another object is to provide a relatively high acrylate content aerosol sprayable adhesive which will remain in a sprayable, non-agglomerated state in the container.

These objects, as well as others which will become apparent hereinafter, are provided by the present invention which in one aspect is a sprayable composition comprising a volatile organic carrier liquid containing therein at least about 2% by volume of a crosslinked, elastomeric acrylate polymer having an insolubility factor (as hereinafter defined) of between about .5 and about .97, the carrier liquid and the acrylate polymer being capable of discharging from the orifice of a container without forming more than minor proportions of non-adherent mist and without forming rubbery strings. While insofar as known compositions containing the specified 2% by volume level of acrylate polymer represent a considerable increase in acrylate content over usable prior art compositions, acrylate contents of from 5% to 20% are readily achieved in the practice of this invention and represent preferred compositions due to the correspondingly reduced carrier liquid quantities and their attendant problems.

In another aspect, the invention is a high polymer content acrylate based spray adhesive composition packaged in a container under pressure, said adhesive composition comprising a volatile organic carrier liquid containing therein at least about 2% by volume of a crosslinked, elastomeric acrylate polymer having an insolubility factor of from about .5 to about .97, said carrier liquid and said acrylate polymer being contained in an aerosol container under pressure with a propellant which will cause said adhesive composition to spray when discharged from said container through an orifice without forming more than minor proportions of non-adherent mist and without forming rubbery strings.

The compositions of this invention overcome the many disadvantages of the prior art by the employment of acrylic elastomers which have been crosslinked to the extent that a major proportion, e.g. 50% to as much as 97% by weight, is insoluble in hexane and other common volatile organic solvents per a standard test hereinafter described. Previously known acrylate spray compositions utilized acrylate polymers which were essentially completely soluble in the organic solvents and carrier liquids under the conditions employed. Highly crosslinked or "gelled" elastomers have been known in the adhesives art for some time: see for example Stevens, U.S. Pat. No. 2,673,845, granted Mar. 30, 1954. Previous to this, Finn Pat. No. 2,537,982, granted Jan. 16, 1951, concerned self-toughening adhesive cements comprising elastomers such as copolymers of butadiene and acrylonitrile. Finn also observes that theretofore rubbery butadiene-acrylonitrile polymers had been vulcanized in adhesive compositions, and discusses the difficulties or problems in respect thereto. More recently, Hendricks et al., Canadian Pat. No. 586,489, discloses adhesive cement compositions containing highly cross-linked elastomers for general spray applications. However, none of these earlier efforts concerned themselves with the specific problems of providing acrylate based spray adhesives.

In addition to the acrylate polymers, carrier liquid and propellant (in the case of an aerosol spray), the sprayable composition may also contain substantial amounts of tackifier resins, exemplary ones including polyterpenes, wood rosins, stabilized ester resins, and terpene phenolics. See also U.S. Pat. 3,239,478 (Harlan) for tackifier resins suitable in the practice of this invention. Tackifying resins function to promote tackiness and improve the adhesive properties of the composition of this invention. The amount of resin may vary greatly; from 0 to 200 parts by weight resin per 100 parts acrylate polymer being suitable. The tackifying resins should be selected on the basis of solubility or compatibility with the carrier liquid and aerosol propellant if such is employed. Other optional additives in addition to tackifying resins include conventional viscosity stabilizers and antioxdants, generally in minor amounts.

The acrylate polymers suitable in the practice of this invention are normally tacky, pressure-sensitive materials which exhibit elastomeric or rubbery properties. They are copolymers of an acrylic acid ester (which term is intended to include alkyl substituted acrylic acid esters such as methacrylic acid esters) and at least one monomer copolymerizable therewith. The acid esters are typically derived from non-tertiary alkyl alcohols or their equivalents such as n-butanol, n-pentanol, isopentanol, 2-methyl butanol, 1-methyl butanol, 1-methyl pentanol, 2-methyl pentanol, 3-methyl pentanol, 2-ethyl butanol, 3-pentanol, 3,5,5-trimethylhexanol, 3-heptanol, isooctanol, n-decanol, dodecanol, and the like. The acrylic acid ester component should contain at least a major proportion of esters having an alkyl chain length (that moiety attached to the oxy atom of the

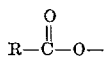

group) of at least four carbon atoms, and the total number of carbon atoms in the average alkyl group should be within the range of about 4–12 carbon atoms. Suitable copolymerizable monomers include acrylic acid, methacrylic acid, itaconic acid, acrylamide, N-alkyl monosubstituted acrylamides, methacrylamide, N-alkyl monosubstituted methacrylamides, acrylonitrile, and methacrylonitrile. The ratio of monomeric acrylic acid ester to copolymerizable monomer is selected to provide a normally tacky (i.e. tacky to the touch at room temperature) and pressure-sensitive adhesive copolymer which, in general calls for a major proportion of acrylic acid ester. Preferably, the copolymerizable monomer or monomers are present to the extent of from about 2% to about 20% by weight of the acrylic acid ester monomer, and most preferably, from about 3% to about 12% by weight. Exemplary acrylic acid esters and monomers copolymerizable therewith are described in U.S. Pat. Re. 24,906 (Ulrich).

Suitable crosslinking agents include the polyfunctional acrylamides and acrylates such as methylene bisacrylamide, 1,4-butanediol diacrylate, diethylene glycol diacrylate, 1,3-butanediol diacrylate, ethylene diacrylate, and glyceryl triacrylate. The amount of crosslinking employed may vary widely, a suitable range being from about 0.05% to about .5% based on the combined weight of the monomers employed.

In addition to the crosslinking agents, chain transfer agents such as relatively long chain mercaptans may be employed. It has been found that these mercaptans improve the adhesion and tack of the adhesive. Amounts of chain transfer agent ranging from about .03% to about .3% based on the combined weight of monomers are suitable. As a rule, when employing a chain transfer agent, slightly more of the crosslinking agent will be employed than is needed when the chain transfer agents are absent.

The above-described acrylate polymers are preferably prepared by emulsion polymerization techniques. The monomers, together with water, emulsifier, crosslinking agent, and chain transfer agent (optional) are charged to a suitable reactor vessel. The reaction mixture is heated to between 95 and 110° F. and a catalyst of the redox type such as a mixture of potassium persulfate and sodium bisulfite added, each component being added separately. The reaction vessel is purged with an inert gas and an inert atmosphere maintained during the reaction. Agitation is also maintained during the reaction. After a short induction time, the polymerization proceeds rapidly with evolution of heat. Upon completion of the polymerization reaction, which is recognized by the levelling off of the reaction temperature, the reactor contents are cooled to about 90° F. and the resulting emulsion passed through cheesecloth, for example. The water is then removed to obtain substantially dry polymer (preferably containing no more than 1% by weight of water).

The effect of crosslinking the acrylate copolymer is, inter alia, to convert at least a portion thereof from a state in which it is soluble in common organic solvents to a state in which it is insoluble therein. Acrylate copolymers crosslinked to the extent that from about 50% to about 97% by weight are rendered insoluble in common organic solvents such as hexane have been discovered to exhibit the requisite sprayable properties even at concentrations as high as 20% by volume and higher while retaining the necessary adhesive properties such as normal tackiness and pressure sensitivity. The measure of the degree of crosslinking which provides the requisite sprayability to the acrylate copolymers is determined indirectly using a solubility test by which an insolubility factor can be assigned to the copolymer. The solubility test is described as follows:

Approximately 1.5 g. of dry polymer is cut up into approximately 0.1 g. pieces and placed in a glass bottle to which 50 g. of hexane is added. The bottle is shaken on a mechanical shaker for 24 hours at room temperature and the contents poured over a No. 4 Whatman filter paper through which passes the portion of the polymer which is soluble in hexane. The filter paper is then washed with two 25 g. aliquots of hexane to insure total passage of the soluble portion of the polymer through the filter paper. The filtrate is then evaporated to dryness and the residue weighed. The percentage of insoluble polymer in the total sample tested is then calculated to arrive at the insolubility factor.

Acrylate polymers in which from 50% by weight to about 97% by weight is insoluble according to the above described test have been found capable of being sprayed in the higher concentrations with which this invention is concerned. For polymer characterization purposes, the insolubility percentage will be expressed herein as an insolubility factor. Thus, a particular crosslinked elastomeric acrylate copolymer as herein described will be assigned a particular insolubility factor equal to the percentage of the total polymer found to be insoluble according to the above test. For example, a polymer in which 50% by weight is insoluble will be described and characterized as a crosslinked, elastomeric acrylate copolymer having an insolubility factor of .50. Further, sprayable polymers will be defined herein as crosslinked, elastomeric, acrylate polymers having an insolubility factor of from about .5 to about .97. To be suitable as an adhesive, the acrylate polymer will be further defined as normally tacky and pressure sensitive. By "normally tacky" is meant that the adhesive is sticky to the touch at temperatures approximating room temperature. By "pressure-sensitive" is meant that the adhesive is capable of forming a permanent paper to paper bond after brief set up time by applying finger tip pressure to press an uncoated piece of paper to one which has received a coating of adhesive.

The solvent or carrier liquid is generally selected on the basis of the end use requirements, solvent properties, evaporation rate, and compatability with the adhesive components. The liquid should be such that it will not dissolve, discolor or otherwise harm the substrates on which the adhesive is to be applied. Examples of suitable organic liquids include hexane, methyl ethyl ketone, methyl isobutyl ketone, and various alcohols. The solvent properties of the liquid should be such that the "insoluble" portion of the acrylate polymer (as determined by the above-described hexane test) is substantially completely insoluble in the carrier liquid and the "soluble" portion is substantially completely soluble in the carrier liquid. These conditions are met for essentially all volatile organic liquids. The mixture of carrier liquid and "insoluble" acrylate polymer portion forms a dispersion whereas the "soluble" portion and the carrier liquid form a solution. The tackifying resins and stabilizing components, if any, should also be soluble in the carrier liquid. Particularly preferred in aerosol applications is 1,1,1-trichloroethane available commercially from Dow Chemical Co. under the trade name "Chlorothene."

Aerosol propellants suitable in the practice of this invention are the conventional pressure-liquefiable, normally gaseous propellants such as propane, isobutane, commercial fluorochlorohydrocarbons such as the "Freons," and blends of the foregoing. Gaseous propellants such as carbon dioxide and nitrous oxide may also be employed.

In the container the propellant is usually present in liquefied form and is dissolved in the carrier liquid. The propellant should be of a type which will not interact with the packaged adhesive in such a manner that the adhesive properties will be adversely affected. The liquefied propellant becomes part of the solvent system in the container and exhibits a solvating effect on the materials dissolved and suspended in the liquid in the container.

Various types of conventional aerosol containers can be used in practicing the invention. Conventional tin-plated cans will generally suffice, but if the adhesive composition contains ingredients reactive with the metal of the containers, the same should be coated on their inner surfaces with a stable polymeric coating such as a polyvinyl chloride or an epoxy polymer in order to minimize any deleterious interaction between the adhesive composition and the container.

The aerosol container preferably is of the type in which the propellant is in liquefied form and mixed with the adhesive composition. As the stream of adhesive and liquefied propellant is dispensed from the orifice in the nozzle of the aerosol container, the propellant vaporizes substantially instantaneously, thereby breaking up the stream into airborne particles of the desired size. The pressures used generally range between 25 and 80 p.s.i.g., the latter limit being imposed for reasons of safety during shipment and storage. About 45 p.s.i.g. pressure in the container is generally preferred.

Conventional spray equipment may be employed, selecting the air cap, fluid tip assemblies, and spray conditions to optimize the quality of the spray. Typical atomization (line) pressures are on the order of 20–90 p.s.i.g.; typical fluid (pot) pressures are 5–30 p.s.i.g.

In general, the dispersion of acrylate polymer in carrier liquid is obtained by soaking the polymer in the carrier liquid for several hours, then subjecting the swollen polymer in carrier liquid to high shear conditions until a smooth dispersion is obtained. Tackifying resin may conveniently be added before or after the soaking step. The resulting dispersion may be diluted further with carrier liquid if desired and is then ready for spraying. For aerosol applications, the dispersion is placed in a suitable container which is then pressurized with propellant to achieve a sprayable consistency.

To further illustrate the invention, the following non-delimiting examples are provided.

EXAMPLE I

A crosslinked isooctyl acrylate/acrylic acid copolymer is prepared using the following composition:

| Ingredient: | | Amount |
| --- | --- | --- |
| Deionized water | lbs | 300 |
| Acrylic acid | lbs | 9.5 |
| Isooctyl acrylate | lbs | 180.5 |
| Ethylene diacrylate [2] | g | 173 |
| t-Dodecyl mercaptan | g | 129.5 |
| "Triton X200" [1] | lbs | 13.6 |
| Sodium bisulfite | g | 57.7 |
| Potassium persulfate | g | 173 |

[1] Rohm & Haas' trade name for a 28% solution of alkylated aryl polyether sodium sulfonate.
[2] Inhibited with 0.1% by weight of the monomethyl ether of hydroquinone.

To a 75 gal. capacity glass-lined kettle fitted with a retreating blade agitator is added the deionized water and Triton X200 emulsifier. Agitation is commenced and is continued uninterrupted throughout the polymer preparation. The isooctyl acrylate, acrylic acid, ethylene diacrylate, and t-dodecyl mercaptan are premixed until uniform and then charged to the kettle. The kettle is sealed, and the reactor batch heated to 100–102° F. The kettle interior is then purged and a nitrogen atmosphere maintained throughout the duration of the reaction. With the reactor charge at 100–102° F., the sodium bisulfite and potassium persulfate catalyst system is added, the kettle quickly resealed to keep air out of the batch, and the polymerization reaction, which is highly exothermic, allowed to proceed. After the batch temperature reaches its peak, the reaction is allowed to continue for about 10 minutes after which agitation is reduced and the batch cooled to 90–100° F. The resulting emulsion is then drained through cheesecloth, and the polymer dried by removal of water.

EXAMPLE II

The following crosslinked acrylate copolymers suitable for use as spray adhesives are prepared according to Example I. (The quantities of ingredients are all expressed in percentages by weight.)

| Acrylic acid | Isooctyl acrylate | Acrylonitrile | Diacrylate |
| --- | --- | --- | --- |
| 7.5 | 97.5 | 0.0 | 0.05 |
| 7.5 | 92.5 | 0.0 | 0.05 |
| 5.0 | 95.0 | 0.0 | 0.025 |
| 2.0 | 88.0 | 10.0 | 0.05 |

EXAMPLE III

Preparation of spray adhesive

To 100 g. of the dry polymer of Example I (95/5 parts by weight of crosslinked copolymer of isooctyl acrylate/acrylic acid) in a 1 qt. container is added 1200 g. of "Chloroethene." This mixture is allowed to stand for 24 hours at room temperature and then is added 60 g. of "S1010" rosin (a polyterpene tackifying resin available from Hercules Powder Co.) and 5 g. of "Arochlor 1262" (a chlorinated biphenyl tackifying resin available from Monsanto Chemical Co.). This mixture is agitated in a high speed, high shear mixer until all of the tackifying resins are dissolved and the acrylate polymer is dispersed into a smooth homogeneous dispersion. (If necessary the end product is diluted to 11–12.0% solids by weight.) This material is then sprayed through conventional spray equipment (Binks' model P–CGA–501FF at an atomization pressure of 25 to 30 p.s.i. and a fluid pressure of 5–30 p.s.i.). When sprayed under these conditions, a uniform spray pattern is formed with essentially no cobwebbing and no excessive misting and the composition exhibits excellent adhesive properties.

EXAMPLE IV

Preparation of aerosol spray adhesive

To an 8 fluid oz. aerosol can is added 194 g. of a dispersion having the same composition as the dispersion of Example III. The can is then purged with "Freon 12" to remove air and moisture and the can equipped with a Neuman-Green B–14–10 valve. Freon 12 (137 g.) is then forced into the can. A Neuman-Green 120–2418 actuator is placed in the valve orifice. When sprayed, this product produces a smooth, tacky film with excellent adhesive properties without cobwebbing or non-adherent mist.

Bonds of "Mylar" film (Du Pont's trade name for a polyester film) to an aluminum panel (Alclad aluminum), "Mylar" to a panel of cold-rolled steel (CRS), canvas to canvas and "Mylar" to plywood are made by aerosol application of the composition of this example on to both bonding surfaces and contact bonding of the respective substrates after 30 minutes open time. Bonds are pulled on a Scott Tensile Tester at 2 inches per minute after aging respectively at room temperature.

PEEL STRENGTH (P.I.W.)

| | "Mylar"/ aluminum | Canvas/ canvas | "Mylar"/ CRS | "Mylar"/fir plywood |
| --- | --- | --- | --- | --- |
| 24 hours | 4 | 4 | 5 | 7–8 |
| 30 days | 4 | 5 | 5 | 7–8 |

Shear dead load resistance

One square inch kraft paper to kraft paper bonds are made by aerosol application of the composition of this example on to one bonding surface and contact bonding after 5 minutes open time. Bonds are subjected to dead loads in shear at room temperature after 24 hours room temperature age.

| Dead load (gms.): | Type of failure |
|---|---|
| 500 | No failure at 30 hours. |
| 1000 | No failure at 30 hours. |

The spray adhesives of this invention are useful in a wide variety of applications. The adhesive in aerosol form is particularly suitable where a delicate or accurate spray pattern is required. The spray adhesives have a very quick initial tack and maintain aggressive tack generally for at least 24 hours at normal room temperature conditions. Other unique properties of the adhesives of this invention include the need for application to only one bonding surface, excellent re-bonding properties, and good adhesion to a wide variety of substrates including paper, wood, steel, plastics and other porous and non-porous surfaces.

What is claimed is:

1. A sprayable adhesive composition comprising a volatile organic carrier liquid containing therein at least 2% by volume of a normally tacky, pressure-sensitive, elastomeric, crosslinked acrylate polymer of at least about 50% by weight of an acrylic acid ester, said acrylate polymer being crosslinked while in emulsion and having an insolubility factor of from about .5 to about .97, said carrier liquid and said acrylate polymer being capable of discharging from the orifice of a container without forming more than minor proportions of non-adherent mist and without forming rubbery strings.

2. The composition of claim 1 wherein said carrier liquid is 1,1,1-trichloroethane.

3. The composition of claim 1 wherein said acrylate polymer is a normally tacky, pressure-sensitive, elastomeric, crosslinked copolymer of isooctyl acrylate and from about 3% to about 12% by weight based on the combined monomer weights of acrylic acid, said copolymer having an insolubility factor of from about .5 to about .97.

4. The composition of claim 1 which additionally contains from 0 to 200 parts by weight per 100 parts by weight of acrylate polymer of tackifying resin.

5. A spray adhesive composition packaged in a container under pressure, said adhesive composition comprising a volatile organic carrier liquid containing therein at least about 2% by volume of a normally tacky, pressure-sensitive crosslinked, elastomeric acrylate polymer of at least about 50% by weight of an acrylic acid ester, said acrylate polymer being crosslinked while in emulsion and having an insolubility factor of from about .5 to about .97, said carrier liquid and said acrylate polymer being contained in an aerosol container under pressure with a propellant which will cause said adhesive composition to spray when discharged from said container through an orifice without forming more than minor proportions of non-adherent mist and without forming rubbery strings.

6. The composition of claim 5 wherein said carrier liquid is 1,1,1-trichloroethane.

7. The composition of claim 5 wherein said acrylate polymer is a normally tacky, pressure-sensitive, elastomeric, crosslinked copolymer of isooctyl acrylate and from about 3% to about 12% by weight based on the combined monomer weights of acrylic acid, said copolymer having an insolubility factor of from about .5 to about .97.

8. The composition of claim 5 which additionally contains from 0 to 200 parts by weight per 100 parts by weight of acrylate polymer of a tackifying resin.

9. A sprayable adhesive composition comprising 1,1,1-trichloroethane as a carrier liquid containing therein at least 2% by volume of a normally tacky, pressure-sensitive crosslinked copolymer of isooctyl acrylate and from about 3% to about 12% by weight based on the combined monomer weights of acrylic acid, said copolymer being crosslinked while in emulsion and having an insolubility factor of from about .5 to about .97, said carrier liquid and said copolymer being capable of discharging from the orifice of a container without forming more than minor proportions of non-adherent mist and without forming rubbery strings.

10. A spray adhesive composition packaged in a container under pressure, said adhesive composition comprising 1,1,1-trichloroethane as a carrier liquid containing therein at least about 2% by volume of a normally tacky, pressure-sensitive crosslinked copolymer of isooctyl acrylate and from about 3% to about 12% by weight based on the combined monomer weights of acrylic acid, said copolymer being crosslinked while in emulsion and having a solubility factor of from about .5 to about .97, said carrier liquid and said copolymer being contained in an aerosol container through an orifice without forming more than minor proportions of non-adherent mist and without forming rubbery strings.

11. A sprayable adhesive composition comprising a volatile organic carrier liquid containing therein at least 2% by volume of a normally tacky, pressure-sensitive, elastomeric, crosslinked acrylate polymer of at least about 50% by weight of an acrylic acid ester, said acrylate polymer being crosslinked while in emulsion during the polymerization step and having an insolubility factor of from about .5 to about .97, said carrier liquid and said acrylate polymer being capable of discharging from the orifice of a container without forming more than minor proportions of non-adherent mist and without forming rubbery strings.

12. The composition of claim 11 wherein said carrier liquid is 1,1,1-trichloroethane.

13. The composition of claim 11 wherein said acrylate polymer is a normally tacky, pressure-sensitive, elastomeric crosslinked copolymer of isooctyl acrylate and from about 3% to about 12% by weight based on the combined monomer weights of acrylic acid, said copolymer having an insolubility factor of from about .5 to about .97.

14. The composition of claim 11 which additionally contains from 0 to 200 parts by weight per 100 parts by weight of acrylate polymer of a tackifying resin.

15. A spray adhesive composition packaged in a container under pressure, said adhesive composition comprising a volatile organic carrier liquid containing therein at least about 2% by volume of a normally tacky, pressure-sensitive crosslinked, elastomeric acrylate polymer of at least about 50% by weight of an acrylic acid ester, said acrylate polymer being crosslinked while in emulsion during the polymerization step and having an insolubility factor of from about .5 to about .97, said carrier liquid and said acrylate polymer being contained in an aerosol container under pressure with a propellant which will cause said adhesive composition to spray when discharged from said container through an orifice without forming more than minor proportions of non-adherent mist and without forming rubbery strings.

16. The composition of claim 15 wherein said carrier liquid is 1,1,1-trichloroethane.

17. The composition of claim 15 wherein said acrylate polymer is a normally tacky, pressure-sensitive, elastomeric, crosslinked copolymer of isooctyl acrylate and from about 3% to about 12% by weight based on the combined monomer weights of acrylic acid, said copolymer having an insolubility factor of from about .5 to about .97.

18. The composition of claim 15 which additionally contains from 0 to 200 parts by weight per 100 parts by weight of acrylate polymer of a tackifying resin.

19. A sprayable adhesive composition comprising 1,1,1-trichloroethane as a carrier liquid containing therein at least 2% by volume of a normally tacky, pressure-sensitive crosslinked copolymer of isooctyl acrylate and from about 3% to about 12% by weight based on the combined monomer weights of acrylic acid, said copolymer being crosslinked while in emulsion during the polymerization step and having an insolubility factor of from about .5 to about .97, said carrier liquid and said copolymer being capable of discharging from the orifice of a container without forming more than minor proportions of non-adherent mist and without forming rubbery strings.

20. A spray adhesive composition packaged in a container under pressure, said adhesive composition comprising 1,1,1-trichloroethane as a carrier liquid containing therein at least about 2% by volume of a normally tacky, pressure-sensitive crosslinked copolymer of isooctyl acrylate and from about 3% to about 12% by weight based on the combined monomer weights of acrylic acid said copolymer being crosslinked while in emulsion during the polymerization step and having a solubility factor of from about .5 to about .97, said carrier liquid and said copolymer being contained in an aerosol container through an orifice without forming more than minor proportions of non-adherent mist and without forming rubbery strings.

References Cited
UNITED STATES PATENTS

| | | | |
|---|---|---|---|
| 2,766,157 | 10/1956 | Peterson | 260—33.8(U)X |
| 3,027,357 | 3/1962 | Stickle | 260—86.1X |

FOREIGN PATENTS

| | | | |
|---|---|---|---|
| 586,489 | 11/1959 | Canada | 260—33.8(U) |

MORRIS LIEBMAN, Primary Examiner

L. T. JACOBS, Assistant Examiner